United States Patent [19]

Speedie

[11] 4,342,438
[45] Aug. 3, 1982

[54] FLEXIBLE STRAP WITH INTEGRAL ATTACHMENT MEANS

[75] Inventor: Robert Speedie, Victoria, Australia

[73] Assignee: Illinois Tool Works Inc., Chicago, Ill.

[21] Appl. No.: 167,967

[22] Filed: Jul. 14, 1980

[30] Foreign Application Priority Data

Jul. 20, 1979 [AU] Australia .............................. PD9658

[51] Int. Cl.³ .............................................. F16L 3/08
[52] U.S. Cl. .................................... 248/73; 24/17 A; 24/16 PB; 248/74 PB
[58] Field of Search ............ 248/71, 73, 74 PB, 74 B; 24/17 A, 17 AP, 16 PB, 326; 411/508, 510

[56] References Cited

U.S. PATENT DOCUMENTS

| | | | |
|---|---|---|---|
| 2,927,497 | 3/1960 | Rapata | 411/508 |
| 3,102,311 | 9/1963 | Martin et al. | 24/16 PB |
| 3,169,004 | 2/1965 | Rapata | 248/71 |
| 3,269,680 | 8/1966 | Bryant | 248/74 PB |

Primary Examiner—Roy D. Frazier
Assistant Examiner—Ramon O. Ramirez
Attorney, Agent, or Firm—Jerold M. Forsberg; Thomas W. Buckman

[57] ABSTRACT

A unitary plastic material cable strap fastener having a flange with a plug member on one side for engaging in a hole in a panel to hold the fastener in position. The plug having a stem with a head at its end and rows of radial wings arranged along its length. A stud extends from the opposite side of the flange coaxial with the plug. A flexible strap member is attached to the flange by a bifurcated end having a pair of legs formed by an opening in the strap end. The strap extends from the flange in the same direction as the stud with the stud extending into the opening with the legs straddling the stud. The strap is provided with a series of stud receiving openings for engaging the stud when the strap is formed into a loop. The flexible legs of the strap permit the strap to be rotated or folded relative to the longitudinal axis of the plug and stud so that it extends perpendicular thereto to permit the stud receiving openings to engage the stud.

9 Claims, 5 Drawing Figures

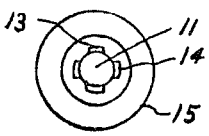
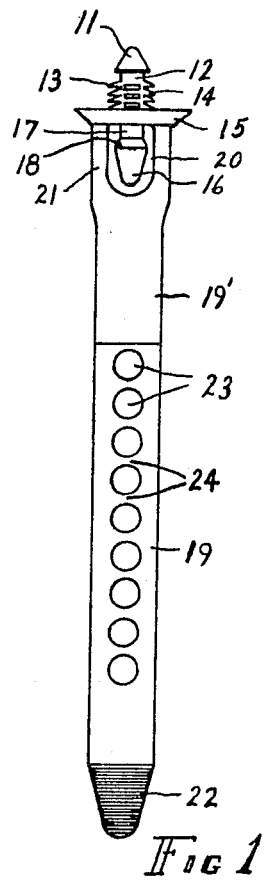
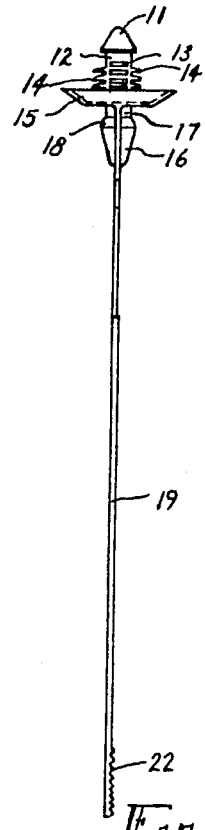
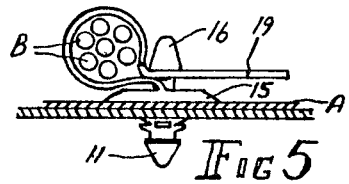
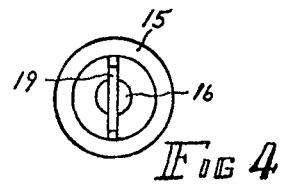

FLEXIBLE STRAP WITH INTEGRAL ATTACHMENT MEANS

FIELD OF THE INVENTION

This invention relates to an improved cable strap or similar fastener and it refers particularly to a strap-like fastener which may be used for securing cables, pipelines and the like, hereinafter referred to as "cable", in position on a panel such as the bulkhead or panel between the engine and the passenger compartment of an automotive vehicle.

DESCRIPTION OF THE PRIOR ART

It is known to provide a drive fastener having a stem with several longitudinal rows of wings extending radially outwardly from the stem, each wing of one row being in a transverse plane which is offset from the plane containing the nearest wing or wings of the adjacent row or rows. Such a construction of fastener is illustrated and described in Australian Patent Specification No. 470,951. It is also known to provide a cable strap having at one end a stud for insertion in a hole in a panel, and a second stud near that end of the strap extending in a direction opposite to that of the first stud, the two opposed studs extending substantially at right angles to the general plane of said strap in its unflexed condition, said strap having at least one opening for engagement by the second stud when the strap is formed into a loop as by wrapping it about a cable.

SUMMARY OF THE INVENTION

It is an object of this invention to provide a cable strap or similar fastener, for securing a cable to a panel, having fastener means which may be readily attached securely to a panel, strap means for holding a cable in position relative to the fastener means, and means for locking the strap in closed position, wherein the composite fastener may be readily manufactured by mass production moulding procedures.

Another object is to provide a strap-like fastener having strap means for holding a cable in position relative to a panel-engaging member and means for locking the strap in closed position, wherein the strap will be urged resiliently into engagement with the strap locking means.

A further object is to provide a cable strap of relatively simple design and construction which may be readily made by mass production techniques and which will be easy to fit in position and easy to operate to secure a cable to a panel such as the bulkhead or panel between the engine and the passenger compartment of an automobile.

Yet another object is to provide a strap-like fastener for securing a cable to a panel wherein a greater and finer range of adjustment of the effective length of the strap may be achieved whilst at the same time achieving a ready connection of the strap to its strap-locking means.

According to this invention there is provided a fastener having attachment means for engagement in a hole in a panel, a strap member for engagement about a cable so as to hold the cable in position, and a stud member for engagement in a hole provided in the strap member, the attachment means, strap member and stud member being of unitary construction. The stud member and attachment means are axially aligned and the common longitudinal axis of said members is in the central plane of the strap member. Preferably, at an intermediate position in the overall length of the attachment means and stud member there is a dished flange which, when the attachment means is pressed into a hole in a panel, will bear resiliently on the panel, and one end of the strap is attached to the outer side of that flange.

In another aspect of the invention there is provided a cable strap fastener consisting of a flange having on one side a plug member for engagement in a hole in a panel so as to hold the fastener in position and on the other side a stud co-axial with the plug member, and a strap member extending from the flange, said strap member having a series of spaced holes for engagement selectively with the stud, the strap member, stud, plug member and flange being of unitary construction and the common longitudinal axis of the plug member and stud being in the central plane of the strap member.

The inner plug member may be of the same general construction as the shank 14 of the plastic drive fastener of Australian Letters Patent 470,951, or it may be of a modified construction wherein the stem of the shank is of cruciform shape in cross section and the wings extending outwardly from the stem make up a somewhat square formation in end view, or the stem may be of circular shape in cross section with the wings providing a cruciform appearance in end view.

BRIEF DESCRIPTION OF THE DRAWINGS

In order that the invention may be readily understood and conveniently put into practical form one exemplary construction of the strap-like fastener will now be described with reference to the accompanying illustrative drawings, wherein:

FIG. 1 is a front view of the fastener;

FIG. 2 is a side view of the fastener;

FIGS. 3 and 4 are end views from the opposite ends of the fastener; and

FIG. 5 shows the fastener attached to a panel and as used to hold a number of small-diameter cables.

DESCRIPTION OF THE PREFERRED EMBODIMENT

The cable strap illustrated in these drawings has a plug member 11 for engagement in a hole in a panel A to which a cable, or a number of cables B, is or are to be attached. The plug member 11 is made somewhat as described and illustrated in the specification of Australian Patent No. 470,951 but in this construction the stem 12 is of circular shape in transverse cross-section and there are four rows of wings 13, 14 extending radially outwardly therefrom, the wings of the two rows 13 being longitudinally offset relative to the wings of the two rows 14.

At the outer end of the plug member 11 is a dished flange 15 which is adapted to bear resiliently on the outer surface of the panel into which the plug 11 is engaged so as to inhibit the passage of dust and/or water through the opening. The stud 16 is moulded integrally with the flange 15 and plug 11 and it is in co-axial alignment with said plug 11. The stud has a stem 17 of circular shape in transverse cross-section and a retaining ledge 18 on the underside of the head.

The strap member 19 has an opening 20 at its inner end, providing two legs 21 on opposite sides of the stud 16 and connecting the strap to the outer surface of the flange 15. The outer end of the strap is serrated transversely at 22 to provide a finger-grip and in the length of the strap are a number of spaced fastening holes 23. These holes 23 are placed relatively close together so that the strips 24 of material between them are relatively narrow, and therefore will stretch more readily when the head of the stud 16 is being pressed into a selected hole 23.

Merely by way of example, the thickness of the strips of material between the holes 23, at the thinnest part, may be about 1/5 of the diameter of the holes.

As shown, that part of the strap 19' between the flange 15 and the portion having the holes 23 is made a little thinner than the remainder of the strap so as to provide a desired degree of flexibility in that inner end part of the strap.

The fastener is made as a unitary moulding in a suitable material such as Nylon 60 or other suitable polyamide.

The reference to the central plane of the strap member is intended to be to the plane of the strap member when it is in the position relative to the other parts as moulded, not when it is wrapped about a cable, and with reference to FIG. 1 is the plane of the paper on which that figure is drawn.

In the use of the fastener the plug member 11 is pressed into a hole of appropriate size in the panel A so that the wings 13, 14 will grip the panel and resist disengagement, and the dished flange 15 will press upon the surface of the panel to apply a resilient pressure thereto and inhibit the passage of dust and moisture. Then the strap 19 is folded downwardly to one side or the other and the cable or group of cables, B, placed across it, close to the stud 16, and the strap is wound about the cable until an appropriate hole 23 is in position to be engaged by the outer end of the stud 16 which is then forced through that selected hole 23 to hold the strap 19 in position, as shown in FIG. 5. By reason of the close spacing of the holes 23 there is provided a relatively fine adjustment of the effective length of the strap, and as the material between the holes 23 will stretch more readily than thicker material (if the holes were the normal distance apart with "one diameter" of material between holes) the holes 23 may be made to be a tighter fit on the stud 16. The folding down of the strap creates a spring member which urges the free end of the strap tightly against the ledge 18 on the underside of the stud head.

It is also to be noted that by providing the opening 20 at the inner end of the strap 19 the stud 16 may be moulded conveniently, such that the composite article may be conveniently moulded in a multicavity two-piece mould or die.

By reason of the construction of the plug member, as illustrated, the cable strap may be used for attachment to panels of different thicknesses. It may also be used for holding in position a wide range of sizes of cable.

It is to be understood that modifications in details of design and construction may be made without departing from the ambit of the invention as defined by the appended claims.

I claim:

1. A cable strap fastener comprising a flange having on one side a plug member for engagement in a hole in a panel so as to hold the fastener in position and on the other side a stud co-axial with the plug member, and a strap member having a bifurcated end attached to and extending from the flange in the same direction as the stud, said strap member having at least one hole for engagement by the stud so as to hold the strap member in the form of a loop, whereby said flange, along with the plug member and the stud, may be rotated relative to the bifurcated end of the strap.

2. A fastener as claimed in claim 1 wherein there is an opening at the end of the strap straddled by the bifurcated end of the strap, said stud being adapted to extend into said opening.

3. A fastener as claimed in claim 1 wherein the strap member has a series of spaced aligned holes any one of which may be engaged with the stud, and the holes are of such diameter and so spaced that the material between two adjacent holes, at the thinnest place, is less than one-half the diameter of the holes.

4. A fastener as claimed in claim 1, wherein the means for attaching the fastener to a panel consists of a stem having a head at its outer end and several rows of substantially radial wings arranged along the length of the stem.

5. A fastener, adapted for detachably securing a cable-like article to a panel having an aperture therein, comprising a flexible strap means adapted to be secured about the cable-like article and an attachment means with a longitudinal axis adapted to cooperate with the aperture in the panel to secure the strap means thereto, said strap means including a bifurcated end having a pair of spaced apart legs defining an opening therebetween, a free end, and at least one aperture between said bifurcated end and said free end, said attachment means including a first means having radially extending aperture engaging means adapted for fastening said first means within said aperture in said panel, a second means extending in an opposite direction from said first means and adapted to cooperate with the aperture in said strap means to form said strap means into a loop, and a radially extending flange means disposed between said first means and said second means, wherein the free ends of each of the legs of the bifurcated end are attached to said radially extending flange means so that one of said first and said second means is formed between said legs and the other of said first and said second means extends outwardly along the longitudinal axis of said strap means when said fastener is in a substantially planar condition.

6. A fastener according to claim 5, wherein said first fastening means includes a stem and wherein said radially extending aperture engaging means includes at least two rows of radially extending wings.

7. A fastener according to claim 5, wherein said first fastening means includes a stem of circular shape in cross section and at least four rows of radially extending wings, the wings of two rows being longitudinally offset in relation to wings of the other two rows.

8. A fastener according to claim 1 wherein the fastener is a unitary device formed of a plastic material.

9. A fastener according to claim 8, wherein the legs of said bifurcated end are flexible to permit said attachment means to be rotated to where the longitudinal axis of said attachment means is substantially perpendicular to the longitudinal axis of said strap means.

* * * * *